United States Patent
Takada (10) Patent No.: US 10,788,320 B2
(45) Date of Patent: Sep. 29, 2020

(54) DEFECT DETECTING DEVICE, DEFECT DETECTING METHOD, AND COMPUTER-READABLE RECORDING MEDIUM

(71) Applicant: NEC CORPORATION, Tokyo (JP)

(72) Inventor: Jun Takada, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/329,029

(22) PCT Filed: Aug. 23, 2017

(86) PCT No.: PCT/JP2017/030159
§ 371 (c)(1),
(2) Date: Feb. 27, 2019

(87) PCT Pub. No.: WO2018/043251
PCT Pub. Date: Mar. 8, 2018

(65) Prior Publication Data
US 2019/0212141 A1 Jul. 11, 2019

(30) Foreign Application Priority Data
Aug. 31, 2016 (JP) ................. 2016-169751

(51) Int. Cl.
*G01M 99/00* (2011.01)
*G01B 21/32* (2006.01)
(Continued)

(52) U.S. Cl.
CPC ............ *G01B 21/32* (2013.01); *G01B 11/026* (2013.01); *G01B 11/16* (2013.01); *G01B 11/24* (2013.01);
(Continued)

(58) Field of Classification Search
CPC ...... G01B 21/32; G01B 11/026; G01B 11/16; G01B 11/24; G01B 21/30; G01M 99/00; G01T 7/0002; G01T 2207/30132
(Continued)

(56) References Cited

U.S. PATENT DOCUMENTS

| | | | | |
|---|---|---|---|---|
| 4,958,306 A | * | 9/1990 | Powell | ................. G01C 7/04 |
| | | | | 702/40 |
| 5,157,619 A | * | 10/1992 | Palusamy | ............ G21C 17/003 |
| | | | | 374/137 |

(Continued)

FOREIGN PATENT DOCUMENTS

| JP | 2004-325209 A | 11/2004 |
|---|---|---|
| JP | 2013-7624 A | 1/2013 |

(Continued)

OTHER PUBLICATIONS

International Search Report for PCT/JP2017/030159 dated Oct. 10, 2017 (PCT/ISA/210).

(Continued)

*Primary Examiner* — Max H Noori
(74) *Attorney, Agent, or Firm* — Sughrue Mion, PLLC (57) ABSTRACT

A defect detecting device 10 includes an overall displacement measurement unit 11 that measures, based on observation data output from an observation device that observes a target object, a displacement of an overall movement of the target object relative to an observation point at set time intervals, as an overall displacement; a specific period detection unit 12 that detects a specific period in which the measured overall displacement is in a specific state within a period in which observation is performed; a partial displacement measurement unit 13 that measures, displacements at a plurality of points set on the target object in the detected specific period, as partial displacements; and a defect detection unit 14 that detects a defect in the target object, based (Continued)

on the acquired at least one of the temporal changes and the spatial distributions of the partial displacements.

15 Claims, 6 Drawing Sheets

(51) Int. Cl.
    *G01B 11/24*     (2006.01)
    *G01B 11/16*     (2006.01)
    *G01B 11/02*     (2006.01)
    *G01B 21/30*     (2006.01)
    *G06T 7/00*     (2017.01)

(52) U.S. Cl.
    CPC ............. *G01B 21/30* (2013.01); *G01M 99/00* (2013.01); *G06T 7/0002* (2013.01); *G06T 2207/30132* (2013.01)

(58) Field of Classification Search
    USPC .......................................................... 73/786
    See application file for complete search history.

(56) References Cited

U.S. PATENT DOCUMENTS

| | | | |
|---|---|---|---|
| 2002/0166983 A1* | 11/2002 | Katzir | ................. G01N 21/956 250/559.45 |
| 2007/0063697 A1* | 3/2007 | Mishkevich | ............. G01B 7/14 324/207.26 |
| 2009/0105589 A1 | 4/2009 | Osaka et al. | |
| 2016/0171309 A1 | 6/2016 | Hay | |

FOREIGN PATENT DOCUMENTS

| | | |
|---|---|---|
| JP | 2013-40820 A | 2/2013 |
| JP | 2015-102363 A | 6/2015 |
| JP | 2016-57102 A | 4/2016 |
| JP | 2016-84579 A | 5/2016 |
| WO | 2006/132203 A1 | 12/2006 |

OTHER PUBLICATIONS

Written Opinion of the International Searching Authority for PCT/JP2017/030159 dated Oct. 10, 2017 (PCT/ISA/237).

* cited by examiner

Fig.4

Step A

Step B

Step C

Step D

Fig.6

DEFECT DETECTING DEVICE, DEFECT DETECTING METHOD, AND COMPUTER-READABLE RECORDING MEDIUM

CROSS REFERENCE TO RELATED APPLICATIONS

This application is a National Stage of International Application No. PCT/JP2017/030159 filed Aug. 23, 2017, claiming priority based on Japanese Patent Application No. 2016-169751, filed Aug. 31, 2016, the disclosure of which is incorporated herein in its entirety by reference.

TECHNICAL FIELD

The present invention relates to a defect detecting device and a defect detecting method for detecting a defect in a structure, such as a tunnel or a bridge, a large machine, or the like, and further relates to a computer-readable recording medium storing a program for implementing the defect detecting device and the defect detecting method.

BACKGROUND ART

In a huge infrastructure, such as a bridge or a tunnel, or the like, it is strongly desired to maintain safety of the infrastructure, as well as to minimize operation stop time. Accordingly, inspection and evaluation techniques capable of accurately detecting a defect without interrupting an operation are required. In many cases, such facilities are installed in a location to which an inspector cannot easily get close. From these points of view, as the inspection and evaluation techniques, a technique capable of effectively performing an inspection remotely in a non-contact manner is proposed (e.g., see PTL 1).

Specifically, PTL 1 discloses a device that evaluates a deterioration state of a structure, based on a moving image captured by a camera. First, the device disclosed in PTL 1 measures, from the moving image, a vibration waveform at each of a plurality of measurement points set on the structure for each frame, and calculates a feature value of the measured vibration waveform. Next, the device disclosed in PTL 1 specifies an area in which a variation in the calculated feature value satisfies a certain condition, and determines whether a defect occurs in the specified area as a target.

In this manner, use of the device disclosed in PTL 1 makes it possible to effectively inspect a structure remotely in a non-contact manner.

CITATION LIST

Patent Literature

[PTL 1] Japanese Unexamined Patent Application Publication No. 2015-102363
[PTL 2] Japanese Unexamined Patent Application Publication No. 2004-325209
[PTL 3] International Publication No. WO 2006/132203

SUMMARY OF INVENTION

Technical Problem

Incidentally, in order for the device disclosed in PTL 1 to reliably determine whether or not a defect is present in a structure, it is necessary to apply a certain external force to a target structure.

In other words, in the device disclosed in PTL 1, when defect determination is carried out in a situation where no external force is applied, it may be erroneously determined that "there is no defect" even when a defect is present.

Accordingly, in order for the device disclosed in PTL 1 to detect a defect, there is a need either to determine, by an operator of the device, whether an external force is applied to the structure, or to install a device for detecting such a state. However, in these cases, another problem, such as an increase in personnel cost and device cost, occurs.

An exemplary object of the present invention is to solve the above-described problems and provide a defect detecting device, a defect detecting method, and a program which are capable of suppressing an increase in cost and occurrence of an erroneous determination in determination of a defect in a structure.

Solution to Problem

In order to achieve the above-described object, a defect detecting device according to an aspect of the present invention includes:

an overall displacement measurement means for measuring, based on observation data output from an observation device that observes a target object, a displacement of an overall movement of the target object relative to an observation point at set time intervals, as an overall displacement;

a specific period detection means for detecting a specific period in which the measured overall displacement is in a specific state within a period in which observation is performed by the observation device;

a partial displacement measurement means for measuring, based on the observation data, displacements at a plurality of points set on the target object in the detected specific period, as partial displacements; and a defect detection means for acquiring at least one of temporal changes and spatial distributions of the partial displacements, and detecting a defect in the target object, based on the acquired at least one of the temporal changes and the spatial distributions of the partial displacements.

Further, in order to achieve the above-described object, a defect detecting method according to an aspect of the present invention includes:

(a) measuring, based on observation data output from an observation device that observes a target object, a displacement of an overall movement of the target object relative to an observation point at set time intervals, as an overall displacement;

(b) detecting a specific period in which the measured overall displacement is in a specific state within a period in which observation is performed by the observation device;

(c) measuring, based on the observation data, displacements at a plurality of points set on the target object in the detected specific period, as partial displacements; and (d) acquiring at least one of temporal changes and spatial distributions of the partial displacements, and detecting a defect in the target object, based on the acquired at least one of the temporal changes and the spatial distributions of the partial displacements.

Furthermore, in order to achieve the above-described object, a computer-readable recording medium according to an aspect of the present invention stores a program in a non-transitory manner, the program causing a computer to execute:

(a) a step of measuring, based on observation data output from an observation device that observes a target object, a displacement of an overall movement of the target object relative to an observation point at set time intervals, as an overall displacement;

(b) a step of detecting a specific period in which the measured overall displacement is in a specific state within a period in which observation is performed by the observation device;

(c) a step of measuring, based on the observation data, displacements at a plurality of points set on the target object in the detected specific period, as partial displacements; and (d) a step of acquiring at least one of temporal changes and spatial distributions of the partial displacements, and detecting a defect in the target object, based on the acquired at least one of the temporal changes and the spatial distributions of the partial displacements.

Advantageous Effects of Invention

As described above, according to the present invention, it is possible to suppress an increase in cost and occurrence of an erroneous determination in determination of a defect in a structure.

EXAMPLE EMBODIMENT

Example Embodiment

A defect detecting device, a defect detecting method, and a program according to an example embodiment of the present invention will be described below with reference to FIGS. 1 to 6.

[Device Structure]

Figure 1:
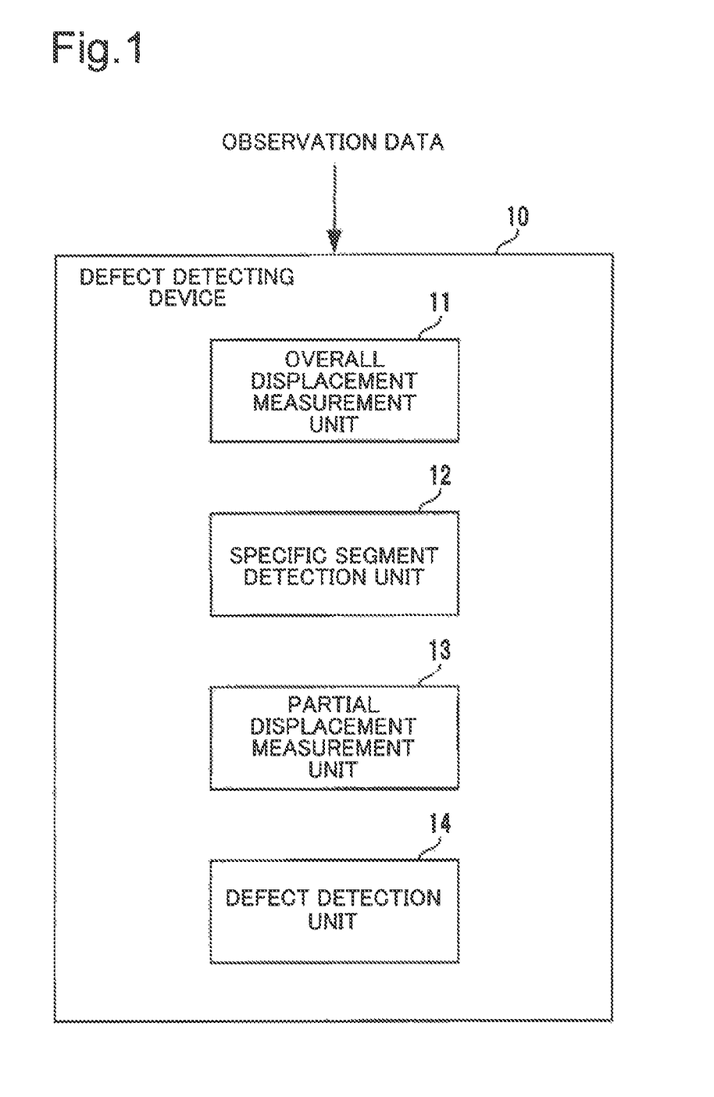
FIG. 1 is a block diagram illustrating a schematic configuration of a defect detecting device according to an example embodiment of the present invention.

First, a configuration of the defect detecting device according to this example embodiment will be described by using FIG. 1. FIG. 1 is a block diagram illustrating a schematic configuration of the defect detecting device according to the example embodiment of the present invention.

A defect detecting device 10 according to this example embodiment illustrated in FIG. 1 is a device for detecting a defect in a structure, such as a tunnel or a bridge, a large machine or the like which are used as a target object. As illustrated in FIG. 1, the defect detecting device 10 includes an overall displacement measurement unit 11, a specific period detection unit 12, a partial displacement measurement unit 13, and a defect detection unit 14.

The overall displacement measurement unit 11 measures, based on observation data output from an observation device that observes a target object, a displacement of an overall movement of the target object relative to an observation point at set time intervals as an overall displacement. The specific period detection unit 12 detects a specific period in which the measured overall displacement is in a specific state within a period in which observation is performed by the observation device. Note that an example of the "specific state" includes a state where a certain external force is applied to the target object and an overall displacement corresponding to the external force is generated.

The partial displacement measurement unit 13 measures, based on the observation data, displacements at a plurality of points set on the target object in the detected specific period as partial displacements. The defect detection unit 14 acquires at least one of temporal changes and spatial distributions of the partial displacements, and detects a defect in the target object based on the acquired at least one of the temporal changes and the spatial distributions of the partial displacements.

Thus, the defect detecting device 10 detects a period in which a load is applied to the target object, i.e., a specific period, based on the displacement of the overall movement of the target object, and defect detection is performed on the specific period. Therefore, according to the defect detecting device 10, occurrence of an erroneous determination can be suppressed. Further, according to the defect detecting device 10, there is no need for an operator of the device to determine whether an external force is applied to the structure, and there is no need to install a device for detecting such a state, and therefore, an increase in cost in the determination of a defect in the target object can also be suppressed.

Figure 2:
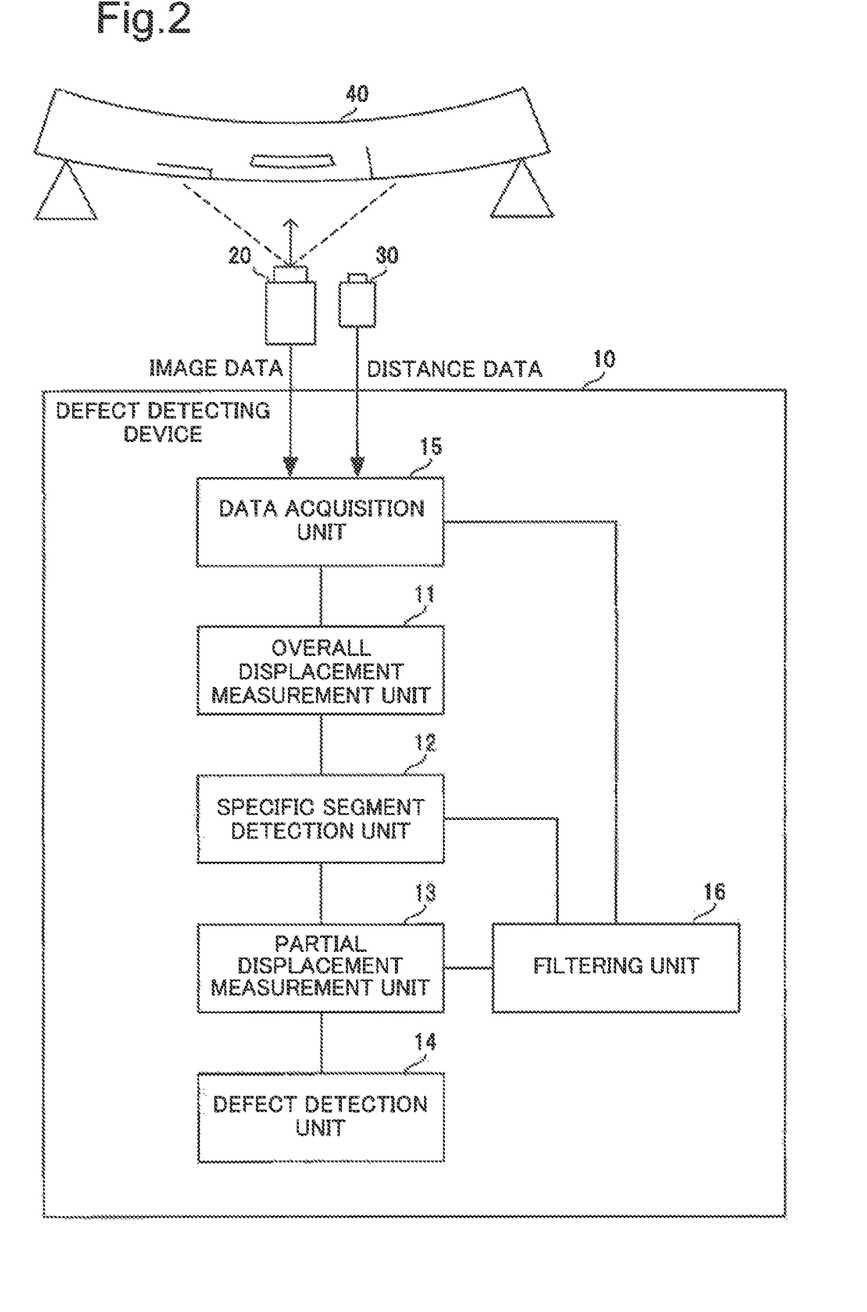
FIG. 2 is a block diagram illustrating a specific configuration of the defect detecting device according to the example embodiment of the present invention.

Next, by using FIG. 2, a specific configuration of the defect detecting device 10 according to this example embodiment will be described. FIG. 2 is a block diagram illustrating a specific configuration of the defect detecting device according to the exemplary embodiment of the present invention.

As illustrated in FIG. 2, in this example embodiment, the defect detecting device 10 is connected to each of an image capturing device 20 and a ranging device 30. Each of the image capturing device 20 and the ranging device 30 functions as an observation device. FIG. 2 also illustrates a structure 40 as a target object for which a defect is detected. In the example illustrated in FIG. 2, the structure 40 is a bridge, which has a beam-like structure that is supported at two points. A time when a vehicle passes through the structure 40 corresponds to a time when an external force is applied to the structure 40. During this time, a vibration occurs in the structure 40.

In the example illustrated in FIG. 2, the image capturing device 20 is arranged in such a way that an image of a lower surface of the structure 40 can be captured. The image capturing device 20 performs image capturing at a set frame rate, and continuously outputs image data on the lower surface of the structure to the defect detecting device 10.

Specific examples of the image capturing device 20 include a digital camera and a digital camcorder.

In the image capturing device 20, a pixel pitch, a lens focal length, the number of pixels, a frame rate, and the like are not particularly limited.

Further, in this example embodiment, the image capturing device 20 is not limited to the device (i.e., the above-described digital camera or video camera) that acquires image data in a chronological order, as long as the device can measure time series signals in a spatial two-dimensional distribution of displacements on the surface of the structure.

Another example of the image capturing device 20 includes a device including an arrayed laser doppler sensor, an arrayed strain gauge, an arrayed vibration sensor, an arrayed acceleration sensor, and the like. In other words, the image capturing device 20 may be a device including an arrayed surface displacement sensor and an arrayed surface strain measuring sensor. When such a device is used, spatial two-dimensional time series signals acquired from these arrayed sensors are treated as "time series images (image information)".

The ranging device 30 measures a distance from the ranging device 30 to the structure 40. Specific examples of the ranging device 30 include various measuring instruments such as a laser distance meter and an ultrasonic distance meter. Further, the ranging device 30 continuously outputs, to the defect detecting device 10, distance data for specifying the measured value of the measured distance at set intervals.

Further, as illustrated in FIG. 2, in this example embodiment, the defect detecting device 10 also includes a data acquisition unit 15 and a filtering unit 16, in addition to the overall displacement measurement unit 11, the specific period detection unit 12, the partial displacement measurement unit 13, and the defect detection unit 14, which are described above.

The data acquisition unit 15 acquires, as observation data, image data output from the image capturing device 20 and distance data output from the ranging device 30. In this example embodiment, the data acquisition unit 15 delivers the distance data among the observation data to the overall displacement measurement unit 11, and delivers the image data to the partial displacement measurement unit 13 via the filtering 16.

In this example embodiment, the overall displacement measurement unit 11 detects a movement of the structure 40 in a normal direction to a surface of the structure among the overall movement of the structure 40, and measures a displacement in the normal direction of the detected movement as the overall displacement. Specifically, the overall displacement measurement unit 11 specifies a distance from the lower surface of the structure 40 to the ranging device 30 (observation point) based on the distance data, and measures the specified distance as the overall displacement. The overall displacement measured at this time is a displacement in the normal direction to the lower surface of the structure 40, and corresponds to a deflection of the structure 40.

In this example embodiment, the specific period detection unit 12 detects, as a specific period in a specific state, a period defined based on a time when the overall displacement reaches a maximum value and a time when the overall displacement reaches a minimum value within a period in which observation is performed by the image capturing device 20 and the ranging device 30.

Figure 3:
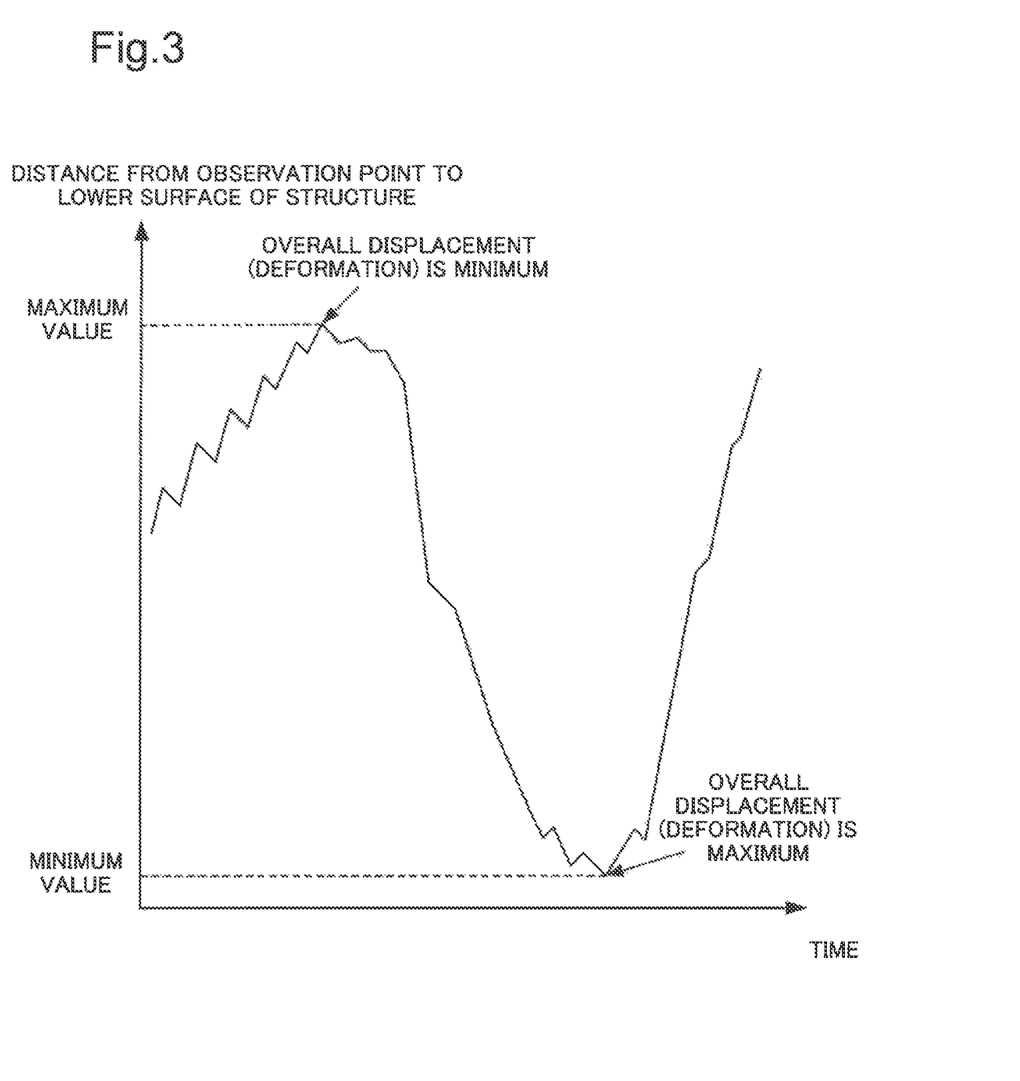
FIG. 3 is a graph illustrating an example of an overall displacement measured according to the example embodiment of the present invention.

The overall displacement measured by the overall displacement measurement unit 11 and the specific period detected by the specific period detection unit 12 will now be described by using FIG. 3. FIG. 3 is a graph illustrating an example of the overall displacement measured according to the example embodiment of the present invention. In FIG. 3, a vertical axis represents a distance from an observation point to the lower surface of the structure 40, and a horizontal axis represents time.

As illustrated in FIG. 3, the structure 40 is deformed depending on a load applied to the structure, and therefore, the distance from the observation point to the lower surface of the structure 40 varies. When the distance reaches a maximum value, the overall displacement (deflection) of the structure 40 reaches a minimum value. On the other hand, when the distance reaches a minimum value, the overall displacement (deflection) of the structure 40 reaches a maximum value.

When the period in which the distance changes from the maximum value to the minimum value is focused, it is considered that the state of the structure 40 changes from a state where no external force is applied to a state where an external force is applied. Accordingly, the specific period detection unit 12 detects, as a specific period, for example, a period from a time when the distance reaches the maximum value to a time when the distance reaches the minimum value.

Further, the specific period detection unit 12 can also detect, as a specific period, a shorter period or a longer period within a set range than the period from the time when the distance reaches the maximum value to the time when the distance reaches the minimum value. Note that the range is set as needed without causing a problem in subsequent processing.

Further, the specific period detection unit 12 can detect the specific period by calculating an average velocity of the distance change. Specifically, the specific period detection unit 12 first calculates an average velocity for each set time window, and specifies a time window in which the average velocity exceeds a threshold among the time windows. Next, the specific period detection unit 12 specifies time windows, in which a sign of the average velocity changes, before and after the specified time window, and sets a start point of the specified former time window as a start point of the specific period and an end point of the specified later time window as an end point of the specific period.

The filtering unit 16 delivers only the observation data output in the specific period among the observation data to the partial displacement measurement unit 13. Specifically, in this example embodiment, the filtering unit 16 receives image data from the data acquisition unit 15, extracts only the image data output during the specific period from the received image data, and delivers only the extracted image data to the partial displacement measurement unit 13.

In this example embodiment, the partial displacement measurement unit 13 uses the image data output during the specific period as observation data, and measures, based on the image data, displacements at a plurality of points set on the structure 40 in the specific period as partial displacements.

Specifically, the partial displacement measurement unit 13 measures the partial displacements based on the image data acquired during a period from a time when the overall displacement reaches the minimum value to a time when the overall displacement reaches the maximum value.

Specifically, since the structure 40 to which an external force is applied vibrates, each point set on the structure 40 also vibrates in association with the vibration. Accordingly, the partial displacement measurement unit 13 tracks each point set on the structure 40 on the image data continuously output during the specific period, and measures a vibration waveform at each point as a displacement at each point. The partial displacement measurement unit 13 may measure coordinates on an image at each point for each image data, instead of measuring the vibration waveform.

Further, in this example embodiment, the partial displacement measurement unit 13 may measure the partial displacements by using only a subset of image data selected out of the image data output during the specific period. For example, the partial displacement measurement unit 13 can measure the partial displacements based on differences between two sets of images, which consist of image data acquired at a time when the overall displacement reaches the maximum value and image data acquired at a time when the overall displacement reaches the minimum value. Note that the image data acquired at the time when the overall displacement reaches the maximum value and the image data acquired at the time when the overall displacement reaches the minimum value are not limited to image data corresponding to one frame, but instead may be image data corresponding to a plurality of set frames.

In this example embodiment, for example, the defect detection unit 14 first calculates a feature value based on the vibration waveforms at each point on the structure 40. Examples of the feature value include a maximum amplitude of a vibration waveform, a phase, a frequency spectrum of a vibration waveform, and a natural frequency. Then, the defect detection unit 14 performs clustering of the calculated feature value at each point. Examples of a clustering technique include a minimum distance method, a maximum distance method, a median method, a centroid method, a group average method, a Ward's method, a flexible method, a K-Means method, and a self-organizing map method.

Subsequently, the defect detection unit 14 divides the image specified by the image data into a plurality of partial areas based on the clustering result. Specifically, the defect detection unit 14 divides the image in such a way that points belonging to the same cluster belong to the same partial area. At this time, existing algorithms, such as an area growth method and a division integration method, can be used for dividing the image. After that, the defect detection unit 14 detects a defect based on the divided image.

Figure 4:
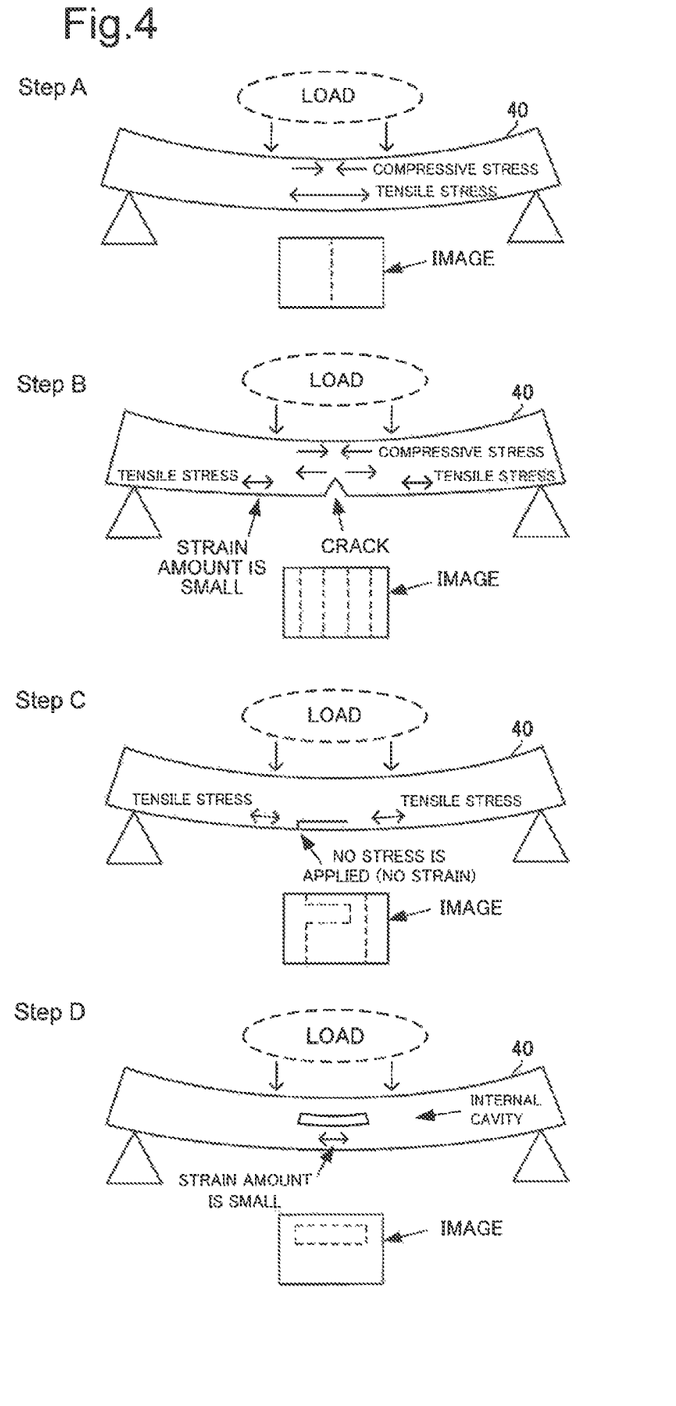
FIG. 4 has diagrams each for explaining an abnormal state of a structure and illustrating different states.

Various abnormalities that occur in the structure 40 and the state of the structure 40 when an abnormality occurs will now be described by using FIG. 4. FIG. 4 has diagrams for explaining an abnormal state of the structure, and illustrating different states, respectively.

The structure 40 illustrated in FIG. 4 is a beam-like structure supported at two points, like in the example illustrated in FIG. 2, and the structure 40 is illustrated in a side view in each of Steps A to D of FIG. 4. Further, a rectangular figure illustrated below the structure 40 in FIG. 4 indicates an example of the divided image.

Incidentally, when no abnormality exists in the structure 40 and the structure 40 is in the normal state, as illustrated in Step A of FIG. 4, a compressive stress acts on an upper surface of the structure and a tensile stress acts on the lower surface of the structure with respect to a vertical load from the upper surface of the structure 40. In this case, the image is divided depending on the direction in which the stresses act.

On the other hand, as illustrated in Step B of FIG. 4, when a crack occurs on the lower surface of the structure 40, an opening displacement due to the load increases in the crack portion. On the other hand, in the vicinity of the crack portion, the stress is not transmitted due to the presence of the crack, the image is divided in a state different from the normal state illustrated in Step A of FIG. 4.

Further, as illustrated in Step B of FIG. 4, when peeling occurs in the inside on the lower surface side of the structure 40, when the structure 40 is observed from the lower surface, an appearance similar to the appearance when the crack illustrated in Step B of FIG. 4 occurs is observed. However, when peeling occurs, the stress is not transmitted between a peeled portion and a portion above the peeled portion. Accordingly, before and after the load, the peeled portion only moves parallelly in a constant direction and a constant amount, thereby no partial displacement occurs in the peeled portion. Therefore, the image is divided in accordance with the peeled portion before and after the load.

As illustrated in Step D of FIG. 4, when a cavity is present inside the structure 40, the transmission of the stress is inhibited in the cavity inside the structure, and therefore, the stress on the lower surface of the structure 40 decreases. Accordingly, since the partial displacement specified from the image also decreases, the image is divided in accordance with the cavity inside the structure.

Further, when the partial displacement measurement unit 13 measures coordinates on the image at each point as partial displacements as described above, the defect detection unit 14 specifies a temporal change of the partial displacements, i.e., a temporal change of the position of each point. In this case, the defect detection unit 14 acquires a movement direction and a movement amount at each point from the temporal change of the position of each point, and performs clustering of the acquired movement direction and movement amount. Also, in this case, the defect detection unit 14 divides the image specified by the image data into a plurality of partial areas based on the clustering result. After that, the defect detection unit 14 detects a defect based on the divided image.

In the example illustrated in FIG. 2, the ranging device 30 is installed along the normal direction to the lower surface of the structure 40 in order to recognize the movement in the normal direction as the overall displacement. However, this example embodiment is not limited to this mode. In this example embodiment, the layout of the ranging device 30 may be arbitrarily determined, as long as the overall displacement can be recognized. For example, the ranging device 30 may be arranged in a state where the ranging device is inclined with respect to a normal line to the lower surface of the structure 40. However, in this case, an inclination angle in a ranging direction with respect to the normal line needs to be specified by a device such as an inclinometer.

Further, in this example embodiment, a movement other than the movement of the lower surface of the structure may be recognized as the overall displacement. Specifically, the overall displacement may be recognized from a movement of a portion in which a defect is likely to occur in the structure 40. For example, the overall displacement may be recognized from a movement of the upper surface or a side surface of the structure 40. In this case, the ranging device 30 is arranged in such a way as to recognize a movement of the upper surface or side surface of the structure 40.

In the example illustrated in FIG. 2, the overall displacement is measured by the ranging device 30. However, this example embodiment is not limited to this mode. In this example embodiment, the overall displacement also may be measured by the image capturing device 20. In this case, the overall displacement measurement unit 11 measures a size of a specific portion of the structure 40 on the image for each image data continuously transmitted from the image capturing device 20, specifies a distance from the lower surface of the structure 40 to the image capturing device 20 (observation point) based on the measured size, and measures the specified distance as the overall displacement.

Further, in the example illustrated in FIG. 2, the partial displacement measurement unit 13 measures vibration waveforms at points set on the structure 40. Accordingly, in this example embodiment, a laser doppler vibration meter, a contact type vibration meter, or the like may be used instead of the image capturing device 20.

[Device Operation]

Figure 5:
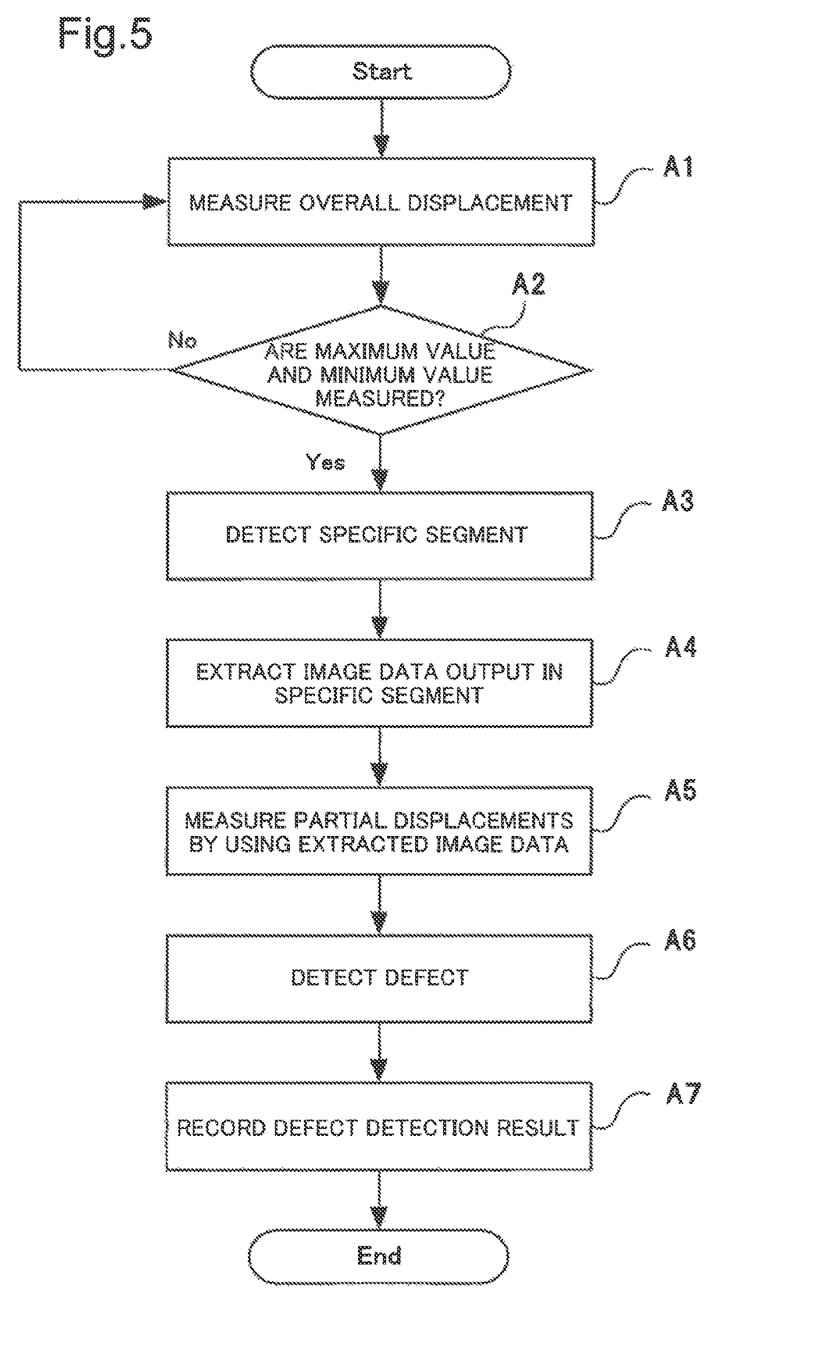
FIG. 5 is a flowchart illustrating an operation of the defect detecting device according to the example embodiment of the present invention.

Next, an operation of the defect detecting device 10 according to the example embodiment of the present invention will be described by using FIG. 5. FIG. 5 is a flowchart illustrating the operation of the defect detecting device according to the example embodiment of the present invention.

In the following description, FIGS. 1 to 4 are referred to as needed. Further, in this example embodiment, the defect detecting device 10 is caused to operate to thereby carry out the defect detecting method. Accordingly, the description of the defect detecting method according to this example embodiment is replaced by the following description of the operation of the defect detecting device 10.

First, as illustrated in FIG. 5, in the defect detecting device 10, the overall displacement measurement unit 11 measures, based on distance data output from the ranging device 30, a distance from the lower surface of the structure 40 to the ranging device 30 (observation point) at set time intervals as the overall displacement of the structure 40 (a step A1). The time intervals are set, for example, depending on a typical period or the like of the overall displacement of the structure 40.

Next, after a lapse of a set time from the start of execution of the step A1, the overall displacement measurement unit 11 determines whether the maximum value and the minimum value are measured in the measurement in the step A1 (a step A2). Specifically, as illustrated in FIG. 3, when the measured values are plotted into a graph, the overall displacement measurement unit 11 determines whether or not a convex shape with a certain size or larger is observed in a set time, whether or not a convex shape is observed within a period of a time of interest by extracting low frequency components in the graph, and the like. When the above-mentioned convex shapes in the upward direction and the downward direction are observed, the overall displacement measurement unit 11 determines that the maximum value and the minimum value are measured.

Further, when the measured values are plotted into a graph, it can be assumed that the above-mentioned convex shapes are not acquired. In this case, the overall displacement measurement unit 11 may determine that the maximum value and the minimum value are measured, assuming that a maximum value or a minimum value among the measured values which are measured at set times is used as the minimum value or the maximum value of the displacement.

Further, in the overall displacement measurement unit, a contrivance for avoiding an erroneous detection due to a disturbance included in the measured values may be made. For example, when a difference between the maximum value and the minimum value which are acquired as described above is less than a predetermined value, the overall displacement measurement unit 11 may determine that the maximum value and the minimum value are not measured.

As a result of determination in the step A2, when the maximum value and the minimum value are not measured, the overall displacement measurement unit 11 executes the step A1 again. On the other hand, as a result of determination in the step A2, when the maximum value and the minimum value are measured, the overall displacement measurement unit 11 notifies the specific period detection unit 12 that the maximum value and the minimum value are measured.

Next, upon receiving the notification from the overall displacement measurement unit 11, the specific period detection unit 12 detects, as a specific period, a period defined at a time when the overall displacement reaches the maximum value and at a time when the overall displacement reaches the minimum value within a period in which observation is performed by the image capturing device 20 and the ranging device 30 (a step A3).

Next, the filtering unit 16 extracts only the image data output in the specific period detected in the step A3 from the observation data output from the image capturing device 20, and delivers the extracted image data to the partial displacement measurement unit 13 (a step A4).

Next, the partial displacement measurement unit 13 measures, based on the image data extracted in the step A4, displacements at a plurality of points set on the structure 40 in the specific period as partial displacements (a step A5). Specifically, the partial displacement measurement unit 13 tracks each point set on the structure 40 on the image data, and measures a vibration waveform at each point as a displacement at each point.

Next, the defect detection unit 14 acquires a spatial distribution of the partial displacements, and detects a defect in the structure 40 based on the acquired spatial distribution of the partial displacements (a step A6). Specifically, the defect detection unit 14 calculates a feature value at each point on the structure 40, performs clustering of the feature values, and divides the image into a plurality of partial areas based on the clustering result. Further, the defect detection unit 14 detects a defect based on the divided image.

Next, the defect detection unit 14 records the defect detection result in a storage device (not illustrated in FIG. 2) (a step A7). After the execution of the step A7, the processing in the defect detecting device 10 is terminated. After that, when each of the image capturing device 20, the ranging device 30, and the defect detecting device 10 is installed in another location in the structure 40 or beside another structure, the steps A1 to A7 are executed again.

[Advantageous Effects of Example Embodiments]

As described above, according to this example embodiment, a specific period in which an external force is applied to the structure 40 is extracted and defect detection is performed in the specific period, thereby suppressing occurrence of an erroneous determination. Further, after the end of the defect detection in the specific period, defect detection can be newly started for another section in the structure, or for another structure, which leads to a reduction in the time required for the entire defect detection.

Furthermore, there is no need for the operator to determine whether an external force is applied to the structure 40, and there is also no need to install a device for detecting the application of an external force. Consequently, an increase in cost in the determination of a defect in the structure 40 can also be suppressed.

[Program]

A program according to this example embodiment may be a program for causing a computer to execute the steps A1 to A7 illustrated in FIG. 5. This program is installed on a computer and is executed to thereby implement the defect detecting device 10 and the defect detecting method according to this example embodiment. In this case, a Central Processing Unit (CPU) of the computer functions as the overall displacement measurement unit 11, the specific period detection unit 12, the partial displacement measurement unit 13, the defect detection unit 14, the data acquisition unit 15, and the filtering unit 16, thereby performing processing.

Furthermore, the program according to this example embodiment may be executed by a computer system constructed by using a plurality of computers. In this case, for example, each computer may function as any one of the overall displacement measurement unit 11, the specific period detection unit 12, the partial displacement measurement unit 13, the defect detection unit 14, the data acquisition unit 15, and the filtering unit 16.

Figure 6:
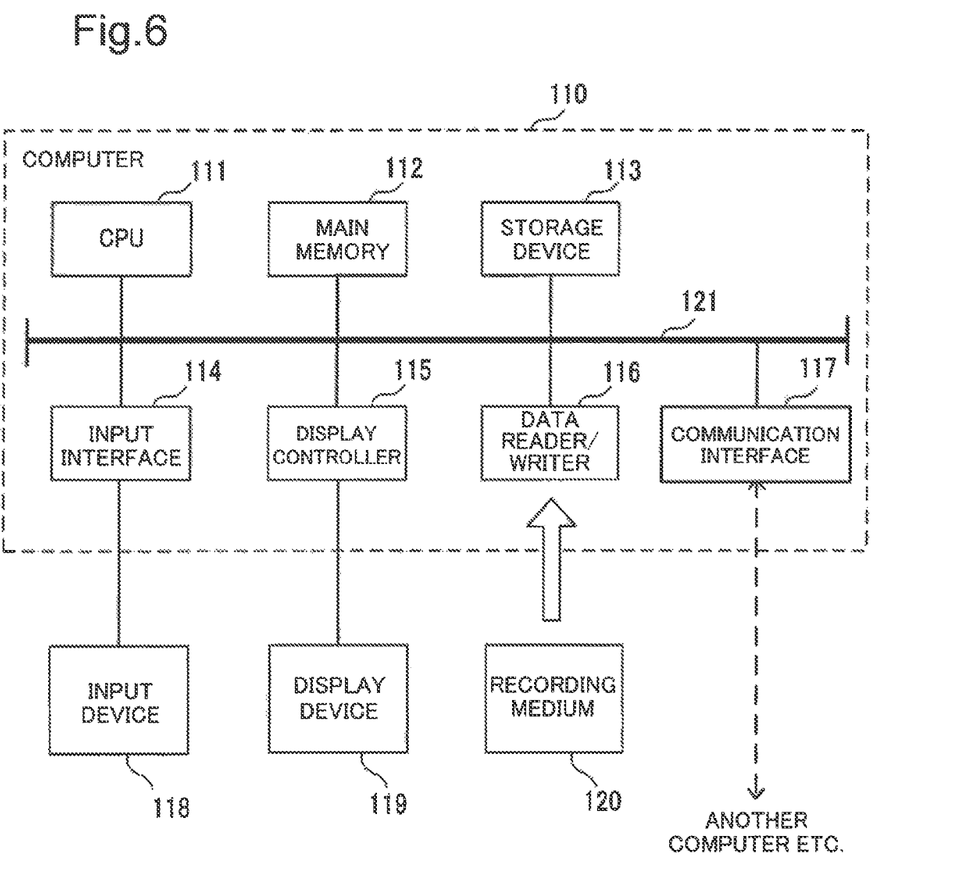
FIG. 6 is a block diagram illustrating an example of a computer that implements the defect detecting device according to the example embodiment of the present invention.

A computer that implements the defect detecting device 10 by executing programs according to this example embodiment will now be described by using FIG. 6. FIG. 6 is a block diagram illustrating an example of a computer for implementing the defect detecting device according to the exemplary embodiment of the present invention.

As illustrated in FIG. 6, a computer 110 includes a CPU 111, a main memory 112, a storage device 113, an input interface 114, a display controller 115, a data reader/writer 116, and a communication interface 117. These units are connected to each other via a bus 121 in such a way that the units can perform data communication.

The CPU 111 loads the programs (code) according to this example embodiment, which are stored in the storage device 113, into the main memory 112, executes the programs in a predetermined order, thereby carrying out various calculations. The main memory 112 is typically a volatile storage device such as a Dynamic Random Access Memory (DRAM). The programs according to this example embodiment are provided in a state where the programs are stored in a computer-readable recording medium 120. Note that the programs according to this example embodiment may be distributed on the Internet connected via the communication interface 117.

Specific examples of the storage device 113 include not only a hard disk drive, but also a semiconductor storage device such as a flash memory. The input interface 114 intermediates data transmission between the CPU 111 and an input device 118 such as a keyboard and a mouse. The display controller 115 is connected to the display device 119, and controls display on the display device 119.

The data reader/writer 116 intermediates data transmission between the CPU 111 and the recording medium 120, reads a program from the recording medium 120, and executes write of the processing result from the computer 110 onto the recording medium 120. The communication interface 117 intermediates data transmission between the CPU 111 and other computers.

Specific examples of the recording medium 120 include general-purpose semiconductor storage devices such as a Compact Flash (registered mark) (CF) and a Secure Digital (SD), magnetic recording media such as a flexible disk, or optical recording media such as a Compact Disk Read Only Memory (CD-ROM).

Note that the defect detecting device 10 according to this example embodiment can be implemented not only by a computer on which a program is installed, but also by hardware corresponding to each unit. Further, a part of the defect detecting device 10 may be implemented by a program, and the remaining part of the defect detecting device 10 may be implemented by hardware.

The whole or part of the present invention can be described as, but not limited to, the following supplementary notes.

[Supplement Note 1]

A defect detecting device including:

an overall displacement measurement means for measuring, based on observation data output from an observation device that observes a target object, a displacement of an overall movement of the target object relative to an observation point at set time intervals, as an overall displacement;

a specific period detection means for detecting a specific period in which the measured overall displacement is in a specific state within a period in which observation is performed by the observation device;

a partial displacement measurement means for measuring, based on the observation data, displacements at a plurality of points set on the target object in the detected specific period, as partial displacements; and a defect detection means for acquiring at least one of temporal changes and spatial distributions of the partial displacements, and detecting a defect in the target object, based on the acquired at least one of the temporal changes and spatial the distributions of the partial displacements.

[Supplement Note 2]

The defect detecting device according to Supplementary note 1, in which the specific period detection means detects, as the specific period, a period defined based on a time when the overall displacement reaches a maximum value and a time when the overall displacement reaches a minimum value within a period in which observation is performed by the observation device.

[Supplement Note 3]

The defect detecting device according to Supplementary note 1 or 2, further including a filtering means for delivering, to the partial displacement measurement means, only observation data output in the specific period among the observation data.

[Supplement Note 4]

The defect detecting device according to any one of Supplementary notes 1 to 3, in which the overall displacement measurement means detects a movement in a normal direction to a surface of the target object among an overall movement of the target object, and measures, as an overall displacement, a displacement of the detected movement in the normal direction.

[Supplement Note 5]

The defect detecting device according to Supplementary note 2, in which the partial displacement measurement means measures the partial displacements, based on observation data acquired at a time when the overall displacement reaches a maximum value and observation data acquired at a time when the overall displacement reaches a minimum value.

[Supplement Note 6]

A defect detecting method including:

(a) measuring, based on observation data output from an observation device that observes a target object, a displacement of an overall movement of the target object relative to an observation point at set time intervals, as an overall displacement;

(b) detecting a specific period in which the measured overall displacement is in a specific state within a period in which observation is performed by the observation device;

(c) measuring, based on the observation data, displacements at a plurality of points set on the target object in the detected specific period, as partial displacements; and (d) acquiring at least one of temporal changes and spatial distributions of the partial displacements, and detecting a defect in the target object, based on the acquired at least one of the temporal changes and the spatial distributions of the partial displacements.

[Supplement Note 7]

The defect detecting method according to Supplementary note 6, in which in the (b), a period defined based on a time when the overall displacement reaches a maximum value and a time when the overall displacement reaches a minimum value within a period in which observation is performed by the observation device is detected as the specific period.

[Supplement Note 8]

The defect detecting method according to Supplementary note 6 or 7, further including (e) using only observation data output in the specific period among the observation data for measuring the partial displacements.

[Supplement Note 9]

The defect detecting method according to any one of Supplementary notes 6 to 8, in which in the (a), a movement in a normal direction to a surface of the target object is detected among an overall movement of the target object, and a displacement of the detected movement in the normal direction is measured as the overall displacement.

[Supplement Note 10]

The defect detecting method according to Supplementary note 7, in which in the (c), the partial displacements are measured based on observation data acquired at a time when the overall displacement reaches a maximum value and observation data acquired at a time when the overall displacement reaches a minimum value.

[Supplement Note 11]

A computer-readable recording medium storing a program causing a computer to execute:

(a) a step of measuring, based on observation data output from an observation device that observes a target object, a displacement of an overall movement of the target object relative to an observation point at set time intervals, as an overall displacement;

(b) a step of detecting a specific period in which the measured overall displacement is in a specific state within a period in which observation is performed by the observation device;

(c) a step of measuring, based on the observation data, displacements at a plurality of points set on the target object in the detected specific period, as partial displacements; and (d) a step of acquiring at least one of temporal changes and spatial distributions of the partial displacements, and detecting a defect in the target object based on the acquired at least one of temporal changes and spatial distributions of the partial displacements.

[Supplement Note 12]

The computer-readable recording medium according to Supplementary note 11, in which in the step (b), a period defined based on a time when the overall displacement reaches a maximum value and a time when the overall displacement reaches a minimum value within a period in which observation is performed by the observation device is detected as the specific period.

[Supplement Note 13]

The computer-readable recording medium according to Supplementary note 11 or 12, in which the computer is caused to further execute (e) using only observation data output in the specific period among the observation data for measuring the partial displacements.

[Supplement Note 14]

The computer-readable recording medium according to any one of Supplementary notes 11 to 13, in which in the step (a), a movement in a normal direction to a surface of the target object is detected among an overall movement of the target object, and a displacement of the detected movement in the normal direction is measured as an overall displacement.

[Supplement Note 15]

The computer-readable recording medium according to Supplementary note 12, in which in the step (c), the partial displacements are measured based on observation data acquired at a time when the overall displacement reaches a maximum value and observation data acquired at a time when the overall displacement reaches a minimum value.

As above, the present invention has been described based on the exemplary embodiments. An exemplary embodiment is just an illustration, and various kinds of changes, addition or subtraction and combinations may be added to each of the above-mentioned exemplary embodiments unless it deviates from the main points of the present invention. It is understood by a person skilled in the art that modification made by adding such changes, addition/subtraction and combinations are also included in the scope of the present invention. While the present invention has been described above with reference to example embodiment, the present invention is not limited to the above-described example embodiment. The configuration and details of the present invention can be changed in various ways that can be understood by those skilled in the art within the scope of the present invention.

INDUSTRIAL APPLICABILITY

As described above, according to the present invention, it is possible to suppress an increase in cost and occurrence of an erroneous determination in determination of a defect in a structure. The present invention is useful in technical fields that require determination of a state of a structure such as a tunnel or a bridge.

REFERENCE SIGNS LIST

10 Defect detecting device
11 Overall displacement measurement unit
12 Specific period detection unit
13 Partial displacement measurement unit
14 Defect detection unit
15 Data acquisition unit
16 Filtering unit
20 Image capturing device
30 Ranging device
40 Structure
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. A defect detecting device comprising:
a memory storing instructions; and
at least one processor configured to process the instructions to implement:
an overall displacement measurement unit configured to measure, based on observation data output from an observation device that observes a target object, a displacement of an overall movement of the target object relative to an observation point at set time intervals, as an overall displacement;

an specific period detection unit configured to detect a specific period in which the measured overall displacement is in a specific state, the specific period being a period between a time when the overall displacement reaches a minimum value and a time when the overall displacement reaches a maximum value, within a period in which observation is performed by the observation device;

a partial displacement measurement unit configured to measure, based on the observation data, displacements at a plurality of points set on the target object in the detected specific period, as partial displacements; and a defect detection unit configured to acquire at least one of temporal changes and spatial distributions of the partial displacements, and detect a defect in the target object, based on the acquired at least one of the temporal changes and the spatial distributions of the partial displacements.

2. The defect detecting device according to claim 1, wherein
the specific period detection unit is further configured to detect, as the specific period, a period from a time when the overall displacement reaches a minimum value to a time when the overall displacement reaches a maximum value within a period in which observation is performed by the observation device.

3. The defect detecting device according to claim 1, wherein the at least one processor is further configured to process the instructions to implement a filtering unit configured to deliver, to the partial displacement measurement unit, only observation data output in the specific period among the observation data.

4. The defect detecting device according to claim 1, wherein
the overall displacement measurement unit is further configured to detect a movement in a normal direction to a surface of the target object among an overall movement of the target object, and measure, as an overall displacement, a displacement of the detected movement in the normal direction.

5. The defect detecting device according to claim 2, wherein
the partial displacement measurement unit is further configured to measure the partial displacements, based on observation data acquired at a time when the overall displacement reaches a maximum value and observation data acquired at a time when the overall displacement reaches a minimum value.

6. A defect detecting method comprising:
(a) measuring, based on observation data output from an observation device that observes a target object, a displacement of an overall movement of the target object relative to an observation point at set time intervals, as an overall displacement;
(b) detecting a specific period in which the measured overall displacement is in a specific state, the specific period being a period between a time when the overall displacement reaches a minimum value and a time when the overall displacement reaches a maximum value within a period in which observation is performed by the observation device;
(c) measuring, based on the observation data, displacements at a plurality of points set on the target object in the detected specific period, as partial displacements; and
(d) acquiring at least one of temporal changes and spatial distributions of the partial displacements, and detecting a defect in the target object, based on the acquired at least one of the temporal changes and the spatial distributions of the partial displacements.

7. The defect detecting method according to claim 6, wherein,
in the (b), a period defined from a time when the overall displacement reaches a minimum value to a time when the overall displacement reaches a maximum value within a period in which observation is performed by the observation device is detected as the specific period.

8. The defect detecting method according to claim 6, further comprising
(e) using only observation data output in the specific period among the observation data for measuring the partial displacements.

9. The defect detecting method according to claim 6, wherein,
in the (a), a movement in a normal direction to a surface of the target object is detected among an overall movement of the target object, and a displacement of the detected movement in the normal direction is measured as the overall displacement.

10. The defect detecting method according to claim 7, wherein,
in the (c), the partial displacements are measured based on observation data acquired at a time when the overall displacement reaches a maximum value and observation data acquired at a time when the overall displacement reaches a minimum value.

11. A non-transitory computer-readable recording medium storing a program causing a computer to execute:
(a) a step of measuring, based on observation data output from an observation device that observes a target object, a displacement of an overall movement of the target object relative to an observation point at set time intervals, as an overall displacement;
(b) a step of detecting a specific period in which the measured overall displacement is in a specific state, the specific period being a period between a time when the overall displacement reaches a minimum value and a time when the overall displacement reaches a maximum value within a period in which observation is performed by the observation device;
(c) a step of measuring, based on the observation data, displacements at a plurality of points set on the target object in the detected specific period, as partial displacements; and
(d) a step of acquiring at least one of temporal changes and spatial distributions of the partial displacements, and detecting a defect in the target object, based on the acquired at least one of the temporal changes and the spatial distributions of the partial displacements.

12. The non-transitory computer-readable recording medium according to claim 11, wherein,
in the step (b), a period from a time when the overall displacement reaches a minimum value to a time when the overall displacement reaches a maximum value within a period in which observation is performed by the observation device is detected as the specific period.

13. The non-transitory computer-readable recording medium according to claim 11, wherein the computer is caused to further execute (e) using only observation data output in the specific period among the observation data for measuring the partial displacements.

14. The non-transitory computer-readable recording medium according to claim 11, wherein, in the step (a), a movement in a normal direction to a surface of the target object is detected among an overall movement of the target object, and a displacement of the detected movement in the normal direction is measured as an overall displacement.

15. The non-transitory computer-readable recording medium according to claim 12, wherein, in the step (c), the partial displacements are measured based on observation data acquired at a time when the overall displacement reaches a maximum value and observation data acquired at a time when the overall displacement reaches a minimum value.

\* \* \* \* \*

UNITED STATES PATENT AND TRADEMARK OFFICE
CERTIFICATE OF CORRECTION

PATENT NO. : 10,788,320 B2
APPLICATION NO. : 16/329029
DATED : September 29, 2020
INVENTOR(S) : Jun Takada Page 1 of 1

It is certified that error appears in the above-identified patent and that said Letters Patent is hereby corrected as shown below:

In the Specification

Column 3, Brief Description of Drawings, Line 35; After "diagrams", delete "each"

In the Claims

Column 16, Line 8; In Claim 7, after "period", delete "defined"

Signed and Sealed this
Twenty-second Day of December, 2020

Andrei Iancu
*Director of the United States Patent and Trademark Office*